United States Patent Office 2,719,151
Patented Sept. 27, 1955

2,719,151

MEROCYANINE DYES CONTAINING A CHAIN PYRRYL GROUP

Donald W. Heseltine and Leslie G. S. Brooker, Rochester, N. Y., assignors to Eastman Kodak Company, Rochester, N. Y., a corporation of New Jersey No Drawing. Application December 1, 1953, Serial No. 395,604

11 Claims. (Cl. 260—240.1)

This invention relates to polymethine dyes and more particularly to trinuclear polymethine dyes containing a pyrryl, indolyl, or pyrrocolyl nucleus. The dyes of our invention can be more accurately described as polymethine dyes containing a pyrryl, indolyl, or pyrrocolyl nucleus substituted on the polymethine bridge or intercyclic chain.

This application is a continuation-in-part of our application Serial No. 267,928, filed January 23, 1952, now U. S. Patent 2,666,761, issued January 19, 1954.

Polymethine dyes containing a pyrryl, indolyl, or pyrrocolyl nucleus have long been known, although such dyes have not, in general, been found to be especially useful in sensitizing photographic silver halide emulsions. Such prior art dyes have been used to advantage in photographic elements as light-filtering agents, however.

We have now found a new class of trinuclear dyes containing a pyrryl, indolyl, or pyrrocolyl nucleus which are especially useful in sensitizing photographic silver halide emulsions.

It is, therefore, an object of our invention to provide a new class of trinuclear dyes containing a pyrryl, indolyl, or pyrrocolyl nucleus. Another object is to provide methods of making such dyes. Still another object is to provide photographic silver halide emulsions sensitized with our new dyes. Another object is to provide a method of preparing such emulsions. A further object is to provide a new class of intermediates which are useful in preparing our new dyes. Other objects will become apparent from a consideration of the following description and examples.

According to our invention we provide new trinuclear dyes containing a pyrryl, indolyl, or pyrrocolyl nucleus selected from those represented by the following general formulas:

I $$R-N(-CH=CH)_{n-1}-C=CH-C=CH(-L=L)_{m-1}-C(=CH-CH)_{d-1}=N-R_1$$

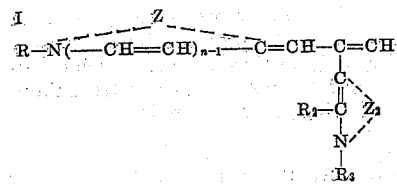

ethyl, carbethoxymethyl, β-carbethoxyethyl, β-sulfoethyl, phenylmercaptomethyl, phenoxymethyl, β - phenylmercaptoethyl, β-phenoxyethyl, etc. (especially an alkyl group containing from 1 to 5 carbon atoms), $R_2$ represents a hydrogen atom, an alkyl group, such as methyl, ethyl, etc., or an aryl group, such as phenyl, etc., $R_3$ represents a hydrogen atom, an alkyl group, such as methyl, ethyl, n-propyl, n-amyl, n-heptyl, n-dodecyl, cyclohexyl, etc. or an aryl group, such as phenyl, o-, m-, and p-tolyl, etc., and $R_2$ and $R_3$ together represent the non-metallic atoms necessary to complete a heterocyclic nucleus of the pyridine series, $Z$ and $Z_1$ each represents the non-metallic atoms necessary to complete a heterocyclic nucleus containing from 5 to 6 atoms in the heterocyclic ring, such as those selected from the group consisting of those of the thiazole series (e. g. thiazole, 4-methylthiazole, 5-methylthiazole, 4-phenylthiazole, 5-phenylthiazole, 4,5-dimethylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5 - phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6 - dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5 - ethoxy-β-naphthothiazole, 7-methoxy-α-naphthothiazole, 8-methoxy - α - naphthothiazole, etc.), those of the thionaphtheno-7′,6′,4,5-thiazole series (e. g. 4′-methoxythionaphteno-7′,6′,4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6 - methoxybenzoxazole, 5 - ethoxybenzoxazole, 6-chlorobenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-

II $$R-N(-CH=CH)_{n-1}-C=CH-C(=CH-CH)_{d}=C-C=O$$

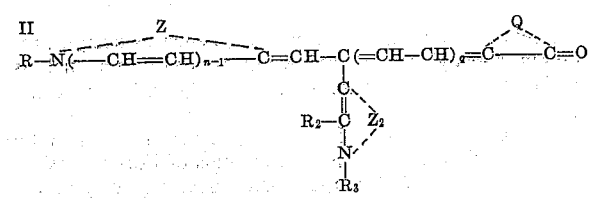

where R and $R_1$ each represents an alkyl group (i. e. an alcohol radical), e. g. methyl, ethyl, n-propyl, isobutyl, n-butyl, isoamyl, n-amyl, β-hydroxyethyl, γ-hydroxypropyl, β-methoxyethyl, β-ethoxyethyl, allyl, β-methylallyl, benzyl (phenylmethyl), β-phenylethyl, β-carboxyethyl, carboxymethyl, α-carboxyethyl, γ-carboxypropyl, β-acetoxyethyl, γ-acetoxypropyl, carbomethoxymethyl, β-carbomethoxymethoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), those of the 2-pyridine series (e. g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g. 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc. $Z_2$ represents the non-metallic atoms necessary to complete a pyrrole nucleus (includes simple pyrrole nuclei and condensed nuclei, e. g. indole), X represents an acid radical, e. g. chloride, bromide, iodide, thiocyanate, sulfamate, methylsulfate, ethylsulfate, perchlorate, benzenesulfonate, p-toluenesulfonate, xylenesulfonate, etc., L represents a methine group (substituted or unsubstituted, e. g. $=CH-$, $=CCH_3-$, etc.), $n$ and $d$ each represents a positive integer of from 1 to 2, $m$ and $q$ each represents a positive integer of from 1 to 3, and Q represents the non-metallic atoms necessary to complete a heterocyclic nucleus containing from 5 to 6 atoms in the heterocyclic ring, such as those selected from the group consisting of those of the thiazolone series, for example: those of the 2,4(3,5)-thiazoledione series, such as 2,4(3,5)-thiazoledione, 3-alkyl-2,4(3,5)-thiazoledions (e. g. 3-ethyl-2,4(3,5)-thiazoledione, etc.), 3-phenyl-2,4(3,5)-thiazoledione, 3-α-naphthyl-2,4(3,5)-thiazoledione, etc., those of the 2-thio-2,4(3,5)-thiazoledione (rhodanine) series, such as 3-alkyl-2-thio-2,4(3,5)-thiazolediones (3-alkylrhodanines) (e. g. 3-ethyl-2-thio-2,4(3,5)-thiazoledione (or 3-ethylrhodanine), 3-phenyl-2-thio-2,4(3,5)-thiazoledione (3-phenylrhodanine), 3-α-naphthyl-2-thio-2,4(3,5)-thiazoledione (3-α-naphthylrhodanine), 3-(1-benzothiazyl)-2-thio-2,4(3,5)-thiazoledione (2-(1-benzothiazyl)rhodanine), etc., those of the 2-alkylmercapto-4(5)-thiazolone series, such as 2-ethylmercapto-4(5)-thiazolone, etc., those of the thiazolidone series, such as 4-thiazolidone or its 3-alkyl (e. g. ethyl, etc.), 3-phenyl or 3-α-naphthyl derivatives, those of the 2-alkylphenylamino-4(5)-thiazolone series (e. g. 2-ethylphenylamino-4(5)-thiazolone, etc.), those of the 2-diphenylamino-4(5)-thiazolone series; those of the oxazolone series, for example: those of the 2-thio-2,4(3,5)-oxazoledione series, such as 3-alkyl-2-thio-2,4(3,5)-oxazolediones (e. g. 3-ethyl-2-thio-2,4(3,5)-oxazoledione, etc.), those of the 2-imino-2,4(3,5)-oxazolone (pseudohydantoin) series, etc.; those of the imidazolone series, for example: those of the 2,4(3,5)-imidazoledione series, such as 2,4(3,5)-imidazoledione (hydantoin) or its 3-alkyl (e. g. ethyl, etc.), 3-phenyl or 3-α-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl, etc.), 1,3-diphenyl, etc. derivatives, those of the 2-thio-2,4(3,5)-imidazoledione series, such as 2-thio-2,4(3,5)-imidazoledione (2-thiohydantoin) or its 3-alkyl (e. g. 3-ethyl, etc.), 3-phenyl or 3-α-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl), 1,3-diphenyl, etc. derivatives, those of the 2-alkylmercapto-5(4)-imidazolone series, such as 2-n-propylmercapto-5(4)-imidazolone; those of the thionaphthenone series, such as 2(1)-thionaphthenone or 1(2)-thionaphthenone; those of the pyrazolone series, such as pyrazolone or its 1-alkyl (e. g. methyl, ethyl, etc.), 1-phenyl, 1-naphthyl (e. g. 1-α-naphthyl), 3-alkyl (e. g. methyl, ethyl, etc.), 3-phenyl, e-naphthyl (3-α-naphthyl), 1-alkyl-3-phenyl (e. g. 1-methyl-3-phenyl, etc.) 3-alkyl-1-phenyl (e. g. 3-methyl-1-phenyl, etc.), 1,3-dialkyl (e. g. 1,3-dimethyl, etc.), 1,3-diphenyl, etc. derivatives; those of the oxindole series, such as 2,3-dihydro-3-ketoindole, and like five-membered heterocyclic nuclei; those of the 2,4,6-triketohexahydropyrimidine series, for example, 2,4,6-triketohexahydropyrimidine (barbituric acid), 2-thio-2,4,6-triketohexahydropyrimidine (2-thiobarbituric acid) as well as their 1-alkyl (e. g. 1-ethyl, etc.) or 1,3-dialkyl (1,3-diethyl, etc.) derivatives; those of the 3,4-dihydro-2(1)-quinolone series, such as 3,4-dihydro-2(1)-quinolone (dihydrocarbostyril); those of the 3,4-dihydro-2(1)-quinoxalone series, such as 3,4-dihydro-2(1)-quinoxalone (oxydihydroquinoxaline), etc.; those of the 3-phenomorpholone (1,4,3-benzoxazine-3(4)-one or benzo-β-morpholone) series, such as 3-phenomorpholone, etc.; those of the 1,4,2-benzothiazine-3(4)-one (ketodihydrobenzoparathiazine) series, such as ketodihydrobenzoparathiazine, etc., and like six-membered heterocyclic nuclei.

The new dyes of our invention represented by Formula I above can advantageously be prepared by condensing an intermediate selected from those represented by the following general formula:

III

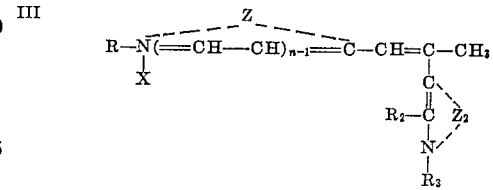

wherein R, $R_2$, $R_3$, Z, $Z_2$, X and $n$ each have the values given above, with a cyclammonium quaternary salt selected from those represented by the following general formula:

IV

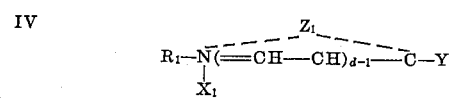

wherein $R_1$, $Z_1$, and $d$ have the values given above, $X_1$ represents an acid radical, such as those set forth above for X, and Y represents an electro-negative group, such as an alkylmercapto group, an arylmercapto group, e. g.:

IVa

wherein $R_4$ represents an alkyl group or an aryl group, such as those given for $R_3$ above; or a β-arylaminovinyl or δ-arylaminobutadienyl group, e. g.:

IVb

wherein $R_5$ represents an acyl group, such as acetyl, propionyl, benzoyl, etc. or a hydrogen atom, $R_6$ represents an aryl group, such as phenyl, o-, m- and p-tolyl, etc., and $e$ represents a positive integer of from 1 to 2; a halogen atom; etc.

The new dyes of our invention represented by Formula II above can advantageously be prepared by condensing an intermediate selected from those represented by Formula III above with an intermediate selected from those represented by the following general formula:

V

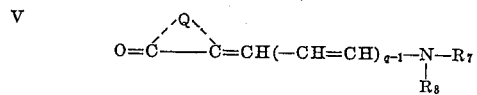

wherein $R_7$ represents an acyl group, such as acetyl, propionyl, benzoyl, etc., $R_8$ represents an aryl group, such as phenyl, o-, m-, and p-tolyl, etc., and Q and $q$ have the values given above.

The condensations of the compounds represented by Formula III with either the compounds of Formula IV or the compounds of Formula V can advantageously be accelerated by heating, e. g. at temperatures varying from room temperature (about 20° C.) to 100° C., or to the reflux temperature of the reaction medium. Inert solvents, such as the aliphatic alcohols, e. g. ethanol, n-propanol, n-butanol, etc., 1,4-dioxane, pyridine, etc. can be used. Basic condensing agents can also be employed to advantage. Typical basic condensing agents comprise the trialkylamines (e. g. triethylamine, tri-n-propylamine, tri-n-butylamine, triisoamylamine, etc.), the N,N-dialkyl-anilines (e. g. N,N-dimethylaniline, N,N-diethylaniline, etc.), the N-alkylpiperidines (e. g. N-methylpiperidine, N-ethylpiperidine, etc.), etc.

The intermediates represented by Formula III can advantageously be prepared by condensing a cyclammonium quaternary salt selected from those represented by the following general formula:

VI
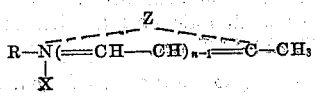

wherein R, Z, X and n have the values given above, together with an alkyl orthoacetate selected from those represented by the following general formula:

VII  $CH_3—C(OR')_3$ wherein R' represents an alkyl group, such as methyl, ethyl, etc., and a compound selected from those represented by the following general formula:

VIII
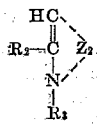

wherein $R_2$, and $R_3$, and $Z_2$ each have the values given above. One instance of the preparation of an intermediate Formula III can be represented by the following equation:

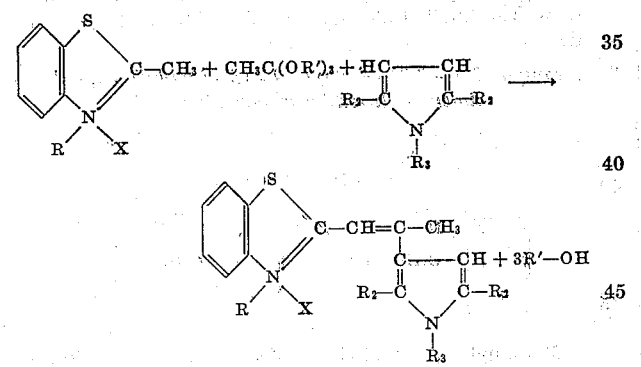

wherein R, $R_2$, $R_3$, R', and X have the values given above. The intermediates represented by Formula III above are new. The condensation of the compounds of Formula VI together with those of Formulas VII and VIII can advantageously be carried out in the presence of an inert diluent, such as ethanol, n-butanol, n-propanol, acetic acid, acetic anhydride, dioxane, etc. Carboxylic anhydrides, such as acetic anhydride, have been found to be particularly useful in increasing the yields of the desired intermediates represented by Formula III. Heating accelerates the condensations, and in general, temperatures varying from room temperature to the reflux temperature of the reaction mixture have been found to be useful.

The intermediates of Formula IV wherein Y represents a β-arylaminovinyl or δ-arylaminobutadienyl group have been previously described in the art. (See, for example, British Patent 344,409, accepted March 4, 1931.) The intermediates of Formula IV wherein Y represents an electro-negative group are also well known. (See, for example, British Patent 424,559, accepted February 18, 1935.) The intermediates of Formula V have also been previously described in the art. (See, for example, Dains et al., "Jour. Am. Chem. Soc.," vol. 31 (1909), p. 1148; vol. 35 (1913), p. 959; vol. 38 (1916), p. 1841; vol. 40 (1918), p. 562; vol. 44 (1922), p. 2310; Berichte, vol. 35 (1902), p. 2496; and U. S. Patent 2,548,571, issued April 10, 1951.) The intermediates of Formulas VI, VII, and VIII have also been previously described in the art. (For example, those of Formula VI in U. S. Patent 2,537,880, issued January 9, 1951, those of Formula VIII in British Patent 529,440, accepted November 21, 1940, and those of Formula VII in U. S. Patent 1,944,563, issued March 19, 1935.)

The following examples will serve to illustrate more fully the manner whereby we practice our invention.

*Example 1.—9-(1-ethyl-2,5-dimethyl-3-pyrryl)-3,3'-dimethylthiacarbocyanine iodide*

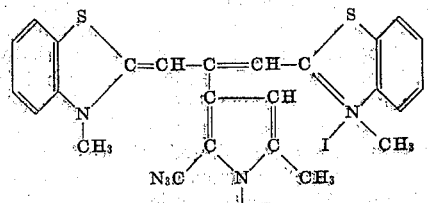

1-ethyl - 2,3',5,6-tetramethyl-3-pyrrolothiacarbocyanine iodide (1.09 grams, 1 mol.) and 3-methyl-2-methylmercaptobenzothiazolium p-toluenesulfonate (0.92 gram, 1 mol.) were dissolved in ethyl alcohol (10 ml.) and triethylamine (0.5 ml., 2 mol.) was added. The reaction mixture was heated under reflux for ten minutes and the crude dye precipitated by the addition of water (100 ml.). The crude dye was filtered off, dried and then recrystallized from methyl alcohol; after two recrystallizations the yield of pure dye was 0.78 gram (53 percent); melting point 169°–170° C.

*Example 2.—9-(1-ethyl-3,5-dimethyl-3-pyrryl)-1',3-dimethyl thia-2'-carbocyanine iodide*

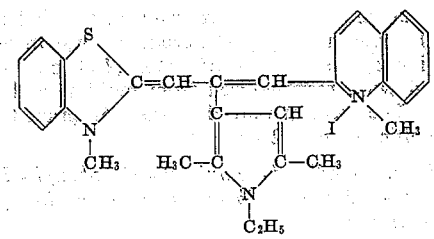

1-ethyl - 2,3',5,6-tetramethyl-3-pyrrolothiacarbocyanine iodide (1.09 grams, 1 mol.) and 1-methyl-2-phenylmercaptoquinolinium iodide (0.95 gram, 1 mol.) were dissoled in ethyl alcohol (15 ml.) and triethylamine (0.7 ml., 2 mol.) was added. The reaction mixture was heated under reflux for 15 minutes, then chilled overnight, filtered and the crude dye (93 percent) dried. After two recrystallizations from methyl alcohol the yield of pure dye was 0.97 gram (68 percent); melting point 250°–251° C.

*Analysis.*—Calculated for $C_{29}H_{30}IN_3S$: I, 21.90. Found: I, 21.8.

*Example 3.—1'-ethyl-9-(1-ethyl-2,5-dimethyl-3-pyrryl)-3-methylthia-4'-carbocyanine iodide*

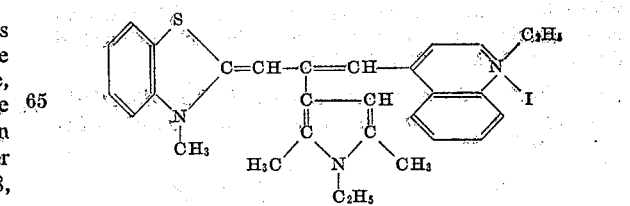

1-ethyl - 2,3',5,6-tetramethyl-3-pyrrolothiacarbocyanine iodide (1.09 grams, 1 mol.), 1-ethyl-4-ethylmercaptoquinolinium bromide (0.75 gram, 1 mol.) and triethylamine (0.7 ml., 2 mol.) were heated under reflux in ethyl alcohol (15 ml.) for 15 minutes.

*Example 4.—3,3'-diethyl-9-(1-ethyl-2,5-dimethyl-3-pyrryl) thiadicarbocyanine perchlorate*

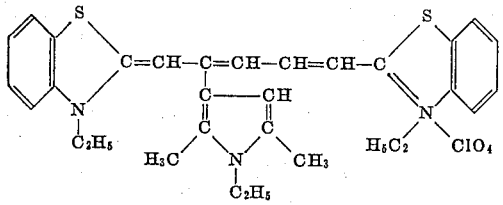

1,3'-diethyl - 2,5,6-trimethyl-3-pyrrolothiacarbocyanine iodide (1.13 grams, 1 mol.), 2-β-acetanilidovinylbenzothiazole ethiodide (1.13 grams, 1 mol.) and triethylamine (0.7 ml., 2 mol.) were refluxed in ethyl alcohol (15 ml.) for 15 minutes. The crude dye was precipitated by the addition of aqueous sodium perchlorate (2 grams in 50 ml.). The crude dye was filtered off, dried and twice recrystallized from methyl alcohol. The yield of pure dye was 0.97 gram (65 percent); melting point 205°–206° C.

*Example 5. — 3 - ethyl - 5 - [4 - (3 -ethyl - 2(3H) - benzothiazolylidene) - 3 - (1 - ethyl - 2,5 - dimethyl - 3 - pyrryl) butenylidene] rhodanine*

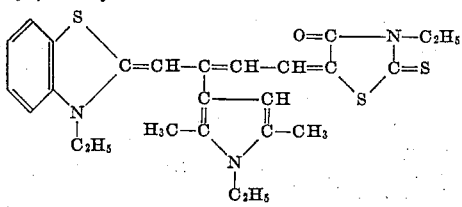

1,3' - diethyl - 2,5,6 - trimethyl - 3 - pyrrolothiacarbocyanine iodide (0.75 gram, 1 mol.), 5-acetanilidomethylene-3-ethylrhodanine (0.55 gram, 1 mol.) and triethylamine (0.5 ml., 2 mol.) were refluxed in ethyl alcohol (15 ml.) for 30 minutes. The crude dye was thrown out of solution by the addition of water (100 ml.), filtered, dried and twice recrystallized from pyridine and methyl alcohol. The yield of pure dye was 0.58 gram (70 percent); melting point 192°–193° C.

*Example 6. — 3,3' - dimethyl - 9 - (2 -phenyl - 1 - pyrrocolyl) - 4,5,4',5' - dibenzothiacarbocyanine p - toluene - sulfonate*

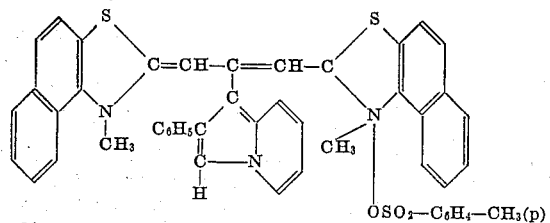

3' - methyl - 2 - phenyl - 4',5' - benzo - 1 - pyrrocolothiacarbocyanine p-toluenesulfonate (1.51 grams, 1 mol.), 1 - methyl - 2 - methylmercaptonaphtho[1,2]thiazolium p-toluenesulfonate (1.05 grams, 1 mol.) and triethylamine (1.4 ml. 1 mol. + 300% excess) were refluxed in ethyl alcohol (20 ml.) for twenty minutes. The reaction mixture was chilled, filtered, and the crude dye was washed with ether, water, and acetone, and dried. After two recrystallizations from methyl alcohol, the yield of purified dye was 25%; M. P. 294–5° C. dec.

*Example 7. — 3 - ethyl - 9 - (1 - ethyl - 2,5 - dimethyl - 3 - pyrryl) - 3' - methyl - 4,5,4',5' - dibenzothiacarbocyanine iodide*

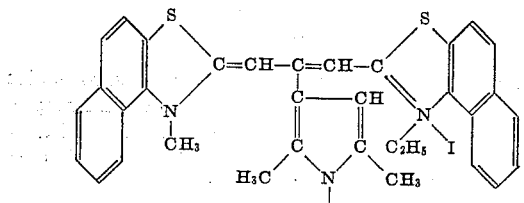

1 - ethyl - 2,3',5,6 - tetramethyl - 4',5' - benzo - 3 - pyrrolothiacarbocyanine iodide (1.22 grams, 1 mol.), 1-ethyl - 2 - ethylmercaptonaphtho[1,2]thiazolium bromide (0.90 gram, 1 mol.) and triethylamine (0.5 gram, 1 mol. + 100% excess) were refluxed in ethyl alcohol (15 ml.) for thirty minutes. After chilling the reaction mixture, the crude dye was filtered off, washed with ether, water, and acetone, and then dried. After two recrystallizations from methyl alcohol, the yield of purified dye was 20%; M. P. 224–5° C. dec.

*Example 8. — 9 - (2,5 - dimethyl - 1 - phenyl - 3 - pyrryl) - 3,3' - dimethyl - 4,5,4',5' - dibenzothiacarbocyanine iodide*

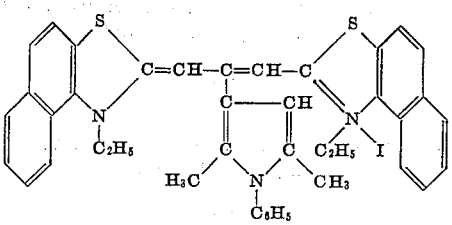

2,3',5,6 - tetramethyl - 1 - phenyl - 4',5' - benzo - 3 - pyrrolothiacarbocyanine iodide (0.83 gram, 1 mol.) and 1 - methyl - 2 - methylmercaptonaphtho[1,2]thiazolium p-toluenesulfonate (1.04 grams, 1 mol. + 70% excess) and triethylamine (1.0 ml., 1 mol. + 300% excess) were refluxed in ethyl alcohol (10 ml.) for one hour. The reaction mixture was chilled and filtered and the crude dye washed with water, methyl alcohol, and acetone, and dried. The yield of purified dye after two recrystallizations from methyl alcohol was 53%; M. P. 217°–18° C. dec.

*Example 9. — 3,3' - diethyl - 9 - (3 - indolyl) - 4,5,4',5' - dibenzoselenathiacarbocyanine iodide*

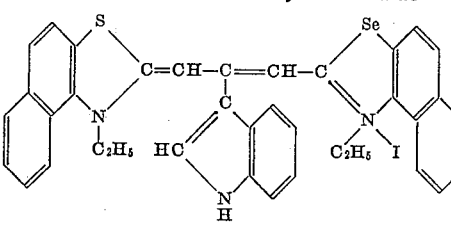

3' - ethyl - 8 - methyl - 4',5' - benzo - 3 - indolothiacarbocyanine iodide (0.50 gram, 1 mol.), 1-ethyl-2-ethylmercaptonaphtho[1,2]selenazolium ethosulfate (0.90 gram, 1 mol. + 100% excess) and triethylamine (0.6 ml., 1 mol. + 300% excess) were refluxed in ethyl alcohol (10 ml.) for one hour. The reaction mixture was filtered hot and the product was thoroughly washed with methyl alcohol and dried. The yield of purified dye was 59% after two recrystallizations from cresol and methyl alcohol; M. P. 281°–2° C. dec.

*Example 10. — 3,3' - dimethyl - 9 - (2 - methyl - 3 - indolyl) - 4,5,4',5' - dibenzothiacarbocyanine p - toluenesulfonate*

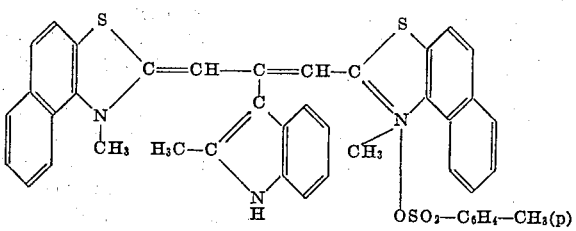

2,3',8 - trimethyl - 4',5' - benzo - 3 - indolothiacarbocyanine p-toluenesulfonate (1.04 grams, 1 mol.), 1-methyl - 2 - methylmercaptonaphtho[1,2]thiazolium p-toluenesulfonate (1.26 grams, 1 mol. + 50% excess) and triethylamine (0.8 gram, 1 mol. + 300% excess) were dissolved in ethyl alcohol (15 ml.) and heated under reflux for one hour. The reaction mixture was chilled and filtered and the crude dye was washed with water and acetone and dried. After two recrystallizations from methyl alcohol, the yield of purified dye was 42%; M. P. 287°-8° C. dec.

*Example 11. — 9 - (1,3 - dimethyl - 2 - indolyl) - 3,3' - diethyl - 4,5,4',5' - dibenzothiacarbocyanine bromide*

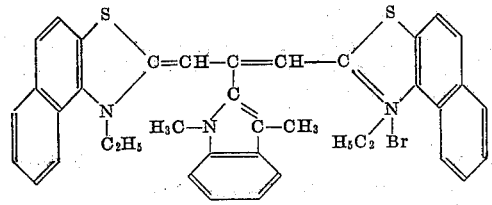

3' - ethyl - 1,3,8 - trimethyl - 4',5' - benzo - 2 - indolothiacarbocyanine bromide (0.57 gram, 1 mol.), 1-ethyl - 2 - ethylmercaptonaphtho[1,2]thiazolium bromide (0.71 gram, 1 mol. + 100% excess) and triethylamine (0.6 ml., 1 mol. + 300% excess) were refluxed in ethyl alcohol (10 ml.) for thirty minutes. The reaction mixture was filtered hot and the crude dye thoroughly washed with methyl alcohol and dried. After two recrystallizations from methyl alcohol, the yield of purified dye was 32%; M. P. 242°-3° C. dec.

*Example 12. — 3,3' - dimethyl - 9 - (2 - methyl - 3 - indolyl) oxacarbocyanine perchlorate*

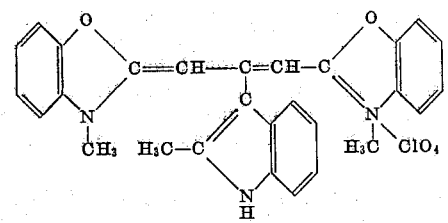

2,3',8-trimethyl-3-indoloxacarbocyanine iodide (2.15 grams, 1 mol.), 3-methyl-2-methylmercaptobenzoxazolium p-toluenesulfonate (3.4 grams, 1 mol.+100% excess) and triethylamine (1.4 ml., 1 mol.+100% excess) were refluxed in ethyl alcohol (20 ml.) for twenty minutes. The reaction mixture was chilled and the dye converted to the perchlorate by the addition of sodium perchlorate (5 grams) in water (100 ml.). The crude dye, after thoroughly washing with water and ether was dissolved in methyl alcohol (10 ml.), again precipitated by the addition of aqueous sodium perchlorate and then stirred until crystalline. The product was then filtered off and twice recrystallized from methyl alcohol. The yield of purified dye was 14%; M. P. 199°–200° C. dec.

*Example 13.—3,3'-dimethyl-9-(3-pyrryl)-4,5,4',5'-dibenzothiacarbocyanine p-toluenesulfonate*

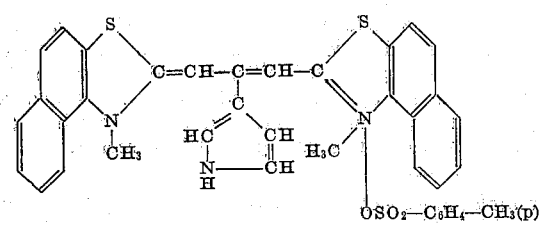

3',6-dimethyl-4'-5'-benzo-3-pyrrolothiacarbocyanine p-toluenesulfonate (0.95 gram, 1 mol.), 1-methyl-2-methylmercaptonaphtho[1,2]thiazolium p-toluenesulfonate (1.66 grams, 1 mol.+100% excess) and triethylamine (1.1 ml., 1 mol.+300% excess) were refluxed in ethyl alcohol (15 ml.) for thirty minutes. The reaction mixture was chilled and filtered and the crude dye washed with methyl alcohol and dried. After two recrystallizations from methyl alcohol the yield of purified dye was 47%; M. P. 272°-3° C. dec.

*Example 14.—3,3'-diethyl-9-(3-indolyl)thiadicarbocyanine iodide*

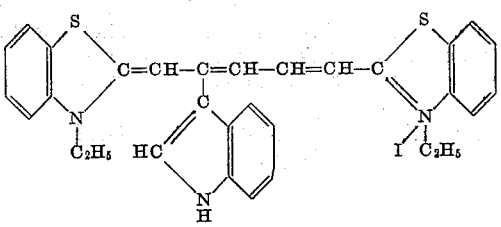

3'-ethyl-8-methyl-3-indolothiacarbocyanine iodide (2.23 grams, 1 mol.), 2-β-acetanilidovinyl-3-ethylbenzothiazolium iodide (2.25 grams, 1 mol.), and triethylamine (1.4 ml., 2 mols.) were dissolved in ethyl alcohol (20 ml.) and heated under reflux for thirty minutes. The crude dye was thrown out of solution by the addition of sodium iodide (5 grams) in water (100 ml.). The product was twice dissolved in acetone (20 ml.) and precipitated with water (100 ml.) and then dissolved in methyl alcohol (100 ml.) and treated with sodium iodide (5 grams). The solution was filtered, the filtrate chilled for several days and the crystalline product filtered. After two recrystallizations from methyl alcohol, the yield of purified dye was 0.30 gram (20 percent). M. P. 209-10° C. dec.

*Example 15.—5'-chloro-3,3'-diethyl-11-(2-methyl-3-indolyl) oxathiadicarbocyanine iodide*

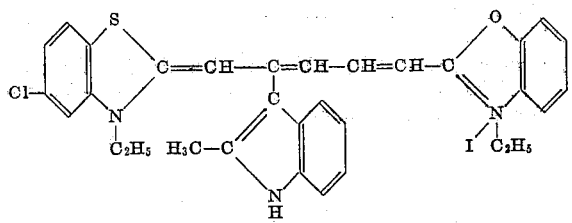

5' - chloro - 3' - ethyl - 2,8 - dimethyl - 3 - indolothiacarbocyanine p-toluenesulfonate (1.76 grams, 1 mol.), 2-β - acetanilidovinyl - 3 - ethylbenzoxazolium iodide (1.45 grams, 1 mol.), and triethylamine (0.46 ml., 1 mol.) were dissolved in ethyl alcohol (20 ml.) and heated under reflux for thirty minutes. The reaction mixture was cooled and the crude dye thrown out of solution by the addition of water (100 ml.). The aqueous solution was decanted and the residue dissolved in methyl alcohol (30 ml.), sodium iodide (5 grams) was added and the mixture stirred until crystallization started. The mixture was then chilled overnight, filtered, and the crude dye washed with a little methyl alcohol and dried. After two recrystallizations from methyl alcohol, the yield of pure dye was 0.38 gram (18 percent). M. P. 198-9° C. dec.

*Example 16.—5,5'-dichloro-3,3'diethyl-9-(2-methyl-3-indolyl) thiadicarbocyanine iodide*

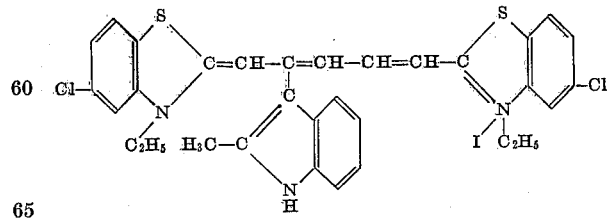

5' - chloro - 3' - ethyl - 2,8 - dimethyl - 3 - indolothiacarbocyanine p-toluenesulfonate (1.76 grams, 1 mol.), 2 - β - acetanilidovinyl - 5 - chloro - 3 - ethylbenzothiazolium iodide (1.6 g., 1 mol.), and triethylamine (0.46 ml., 1 mol.) were dissolved in ethyl alcohol (20 ml.) and heated under reflux for thirty minutes. The reaction mixture was then cooled and the crude dye thrown out of solution by the addition of water (100 ml.). The water was decanted and the crude dye dissolved in methyl alcohol (50 ml.) and sodium iodide (5 grams) added with stirring. The mixture was stirred until crystallization started and then chilled overnight. The crude dye was filtered off, washed with methyl alcohol and dried. After two recrystallizations from methyl alcohol, the yield of purified dye was 1.21 grams (51 percent). M. P. 212–13° C. dec.

*Example 17.—3,3'diethyl-9-(2-methyl-3-indolyl)thiadicarbocyanine iodide*

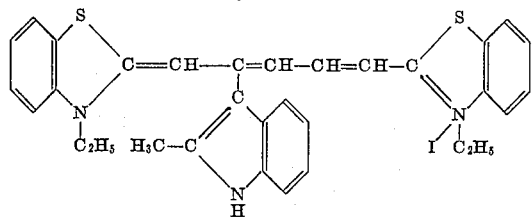

3'-ethyl-2,8-dimethyl-3 - indolothiacarbocyanine iodide (1.53 grams, 1 mol.), 2-β-acetanilidovinyl-3-ethylbenzothiazolium iodide (1.50 grams, 1 mol.), and triethylamine (0.46 ml., 1 mol.) were dissolved in pyridine and heated under reflux for fifteen minutes. The crude dye was thrown out of solution by the addition (with stirring) of water (100 ml.). The water was decanted and the residue stirred with methyl alcohol (20 ml.) until crystalline. The crude dye was then boiled with methyl alcohol, chilled, filtered, washed with methyl alcohol, and dried. After two recrystallizations from methyl alcohol, the yield of pure dye was 1.12 grams (54 percent). M. P. 227–8° C. dec.

*Example 18.—5-[4-(5-chloro-3-ethyl - 2(3H) - benzothiazolylidene) - 3 - (2 - methyl - 3 - indolyl) - 2 - butenylidene]-3-ethylrhodanine*

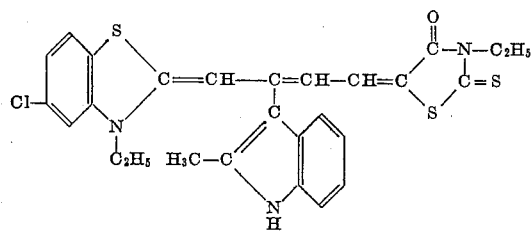

5' - chloro - 3' - ethyl - 2,8 - dimethyl - 3-indolothiacarbocyanine p-toluenesulfonate (1.76 grams, 1 mol.), 5-acetanilidomethylene-3-ethylrhodanine (1.02 grams, 1 mol.), and triethylamine (0.46 ml., 1 mol.) were dissolved in pyridine and heated under reflux for thirty minutes. The reaction mixture was chilled and the crude dye thrown out of solution by the addition (with stirring) of water (100 ml.). The aqueous pyridine solution was decanted and the residue stirred with methyl alcohol until crystalline. The mixture was then heated to boiling, chilled, filtered, and the crude dye washed with methyl alcohol and dried. After two recrystallizations from pyridine and methyl alcohol, the yield of purified dye was 0.91 gram (52 percent). M. P. 286–8° C. dec.

*Example 19.—3-ethyl - 5 - [4 - (3 - ethyl - 2(3H) - benzoxazolylidene) - 3 - (2 - methyl - 3 - indolyl) - 2 -butenylidene]rhodanine*

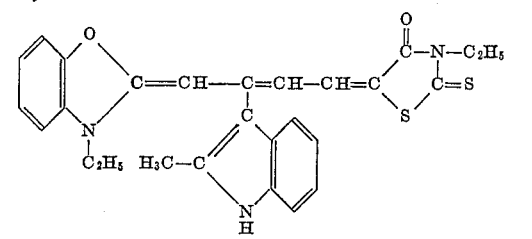

3' - ethyl - 2,8 - dimethyl - 3 - indolo - oxacarbocyanine iodide (1.48 grams, 1 mol.), 5-acetanilidomethylene-3-ethylrhodanine (1.02 grams, 1 mol.), and triethylamine (0.46 ml., 1 mol.) were dissolved in pyridine (20 ml.) and heated under reflux for fifteen minutes. The crude dye was thrown out of solution by the addition (with stirring) of water (100 ml.). The aqueous portion was decanted and the residue stirred with methyl alcohol until crystalline. The mixture was heated to boiling, chilled, filtered, and the crude dye washed with methyl alcohol and dried. After two recrystallizations from pyridine and methyl alcohol, the yield of pure dye was 0.62 gram (39 percent). M. P. 243–4° C. dec.

*Example 20.—3 - ethyl - 5 -[4 - (3 - ethyl - 2(3H) - benzothiazolylidene) - 3 - (2 - methyl - 3 - indolyl) - 2 - butenylidene]rhodanine*

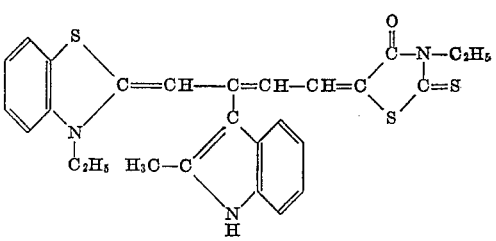

3' - ethyl - 2,8 - dimethyl - 3 - indolothiacarbocyanine iodide (1.53 grams, 1 mol.), 5-acetanilidomethylene-3-ethylrhodanine (1.02 grams, 1 mol.), and triethylamine (0.46 ml., 1 mol.) were heated under reflux for fifteen minutes in pyridine (15 ml.). The crude dye was thrown out of solution by the addition (with stirring) of water (100 ml.). The aqueous pyridine solution was decanted and the crude dye alternately stirred and heated with methyl alcohol (50 ml.) until crystallization started. The reaction mixture was then chilled, filtered, and the crude dye washed with methyl alcohol and dried. After two recrystallizations from pyridine and methyl alcohol, the yield of pure dye was 0.72 gram (44 percent). M. P. 218–19° C. dec.

*Example 21.—3 - ethyl - 5 - [4 - (1 - methyl - 2(1H)-naphtho[1,2]thiazolylidene) - 3 - pyrryl - 2 - butenylidene]rhodanine*

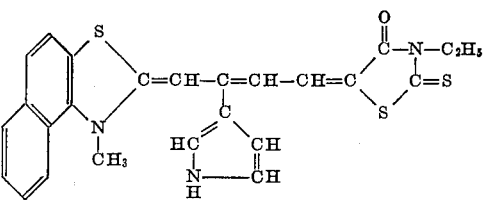

3',6 - dimethyl - 4',5' - benzo - 3 - pyrrolothiacarbocyanine p-toluenesulfonate (1.59 grams, 1 mol.), 5-acetanilidomethylene-3-ethylrhodanine (1.02 grams, 1 mol.), and triethylamine (0.46 ml., 1 mol.) were dissolved in pyridine (20 ml.) and heated under reflux for thirty minutes. The crude dye was precipitated by the addition with stirring of water (100 ml.). The aqueous pyridine was then decanted and the residue stirred with methyl alcohol (50 ml.) until crystallization started. The mixture was then heated to boiling, chilled, filtered, and the crude dye washed with methyl alcohol and dried. After two recrystallizations from pyridine and methyl alcohol, the yield of pure dye was 0.92 gram (58 percent). M. P. 237–8° C. dec.

*Example 22.—3 - ethyl - 5 - [4 - (1 - ethyl - 2(1H) - naphtho[1,2]thiazolylidene) - 3 - (2 - methyl - 3 - indolyl)-2-butenylidene]rhodanine*

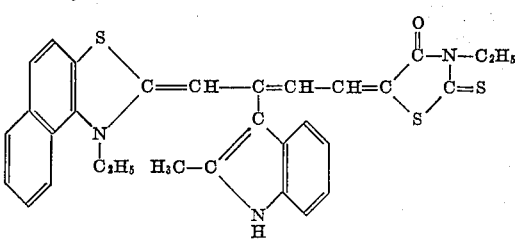

3' - ethyl - 2,8 - dimethyl - 4',5' - benzo - 3 - indolothiacarbocyanine iodide (1.28 grams, 1 mol.), 5 - acetanilidomethylene-3-ethylrhodanine (0.84 gram, 1 mol. plus 10 percent), and triethylamine (0.7 ml., 1 mol. plus 100 percent) were dissolved in pyridine (10 ml.) and heated under reflux for fifteen minutes. The crude dye was thrown out of solution by the addition with stirring of 50 percent aqueous methyl alcohol (100 ml.). The crude dye was filtered off, washed with water and methyl alcohol and dried. After two recrystallizations from pyridine and methyl alcohol, the yield of pure dye was 1.09 grams (79 percent). M. P. 274–5° C. dec.

*Example 23.*—4 - [4 - (1 - ethyl - 2(1H) - naphtho[1,2]-thiazolylidene) - 3 - [2 - methyl - 3 - indolyl) - 2 - butenylidene] - 3 - methyl - 1 - phenyl - 5 - pyrazolone

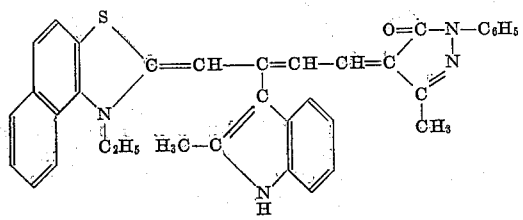

3' - ethyl - 2,8 - dimethyl - 4',5' - benzo - 3 - indolothiacarbocyanine iodide (1.28 grams, 1 mol.), 4-acetanilidomethylene - 3 - methyl - 1 - phenyl - 5 - pyrazolone (0.98 gram, 1 mol. plus 20 percent), and triethylamine (0.7 ml., 1 mol. plus 100 percent) were dissolved in pyridine (15 ml.) and heated under reflux for fifteen minutes. The crude dye was thrown out of solution by the addition of water (25 ml.). The aqueous solution was decanted and the crude dye boiled with ethyl alcohol (50 ml.) until crystalline. The mixture was then chilled and filtered and crude dye washed with water and methyl alcohol and dried. After two recrystallizations from pyridine and methyl alcohol, the yield of pure dye was 0.84 gram (59 percent). M. P. 223–5° C. dec.

*Example 24.*—3 - ethyl - 5 - [4 - (1 - ethyl - 2(1H) - naphtho[1,2]thiazolylidene) - 3 -(2-methyl - 3 - indolyl) - 2 - butenylidene] - 1 - phenyl - 2 - thiohydantoin

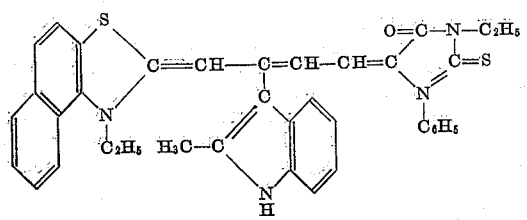

3' - ethyl - 2,8 - dimethyl - 4',5' - benzo - 3 - indolothiacarbocyanine iodide (1.28 grams, 1 mol.), 3-ethyl-1-phenyl-2-thiohydantoin (1.1 grams, 1 mol. plus 100 percent), diethoxymethyl acetate (1.62 grams, 1 mol. plus 300 percent), and triethylamine (0.7 ml., 1 mol. plus 100 percent) were dissolved in pyridine (15 ml.) and heated under reflux for fifteen minutes. The reaction mixture was stirred with water (100 ml.) and the aqueous portion decanted. The oily residue was extracted with benzene (50 ml.), filtered and boiling ligroin (100 ml.) added and the benzene boiled off. The ligroin solution was then chilled, filtered, and the crude dye dried. After two recrystallizations from ligroin, the yield of purified dye was 0.69 gram (45 percent). M. p. 114–5° C.

*Example 25.*—5-[4-(1-ethyl-2(1H)-naphtho 1,2 thiazolylidene) - 3 - (2 - methyl - 3 - indolyl) - 2 - butenylidene]-1-methyl-2-thiobarbituric acid

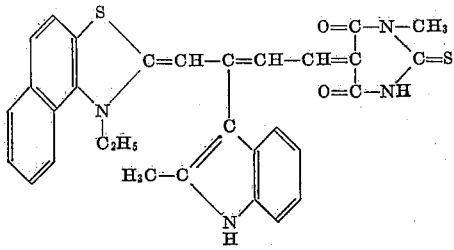

3' - ethyl - 2,8 - dimethyl - 4',5' - benzo - 3 - indolothiacarbocyanine iodide (1.28 grams, 1 mol.), 1-methyl-2-thiobarbituric acid (0.79 gram, 1 mol. plus 100 percent), diethoxymethyl acetate (1.62 grams, 1 mol. plus 300 percent), and triethylamine (0.7 ml., 1 mol. plus 100 percent) were dissolved in pyridine and heated under reflux for fifteen minutes. The crude dye was thrown out of solution by the addition (with stirring) of water (20 ml.). The crude dye was stirred with methyl alcohol (25 ml.) until crystalline and then chilled, filtered, and dried. After two recrystallizations from pyridine and methyl alcohol the yield of pure dye was 0.88 gram (65 percent). M. P. 322–2° C. dec.

*Example 26.*—3 - methyl - 4 - [4 - (1 - methyl - 2(1H)-naphtho[1,2]thiazolylidene) - 3 - (3 - pyrryl) - 2 - butenylidene]-1-phenyl-5-pyrazolone

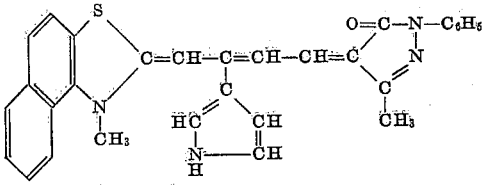

3',6 - dimethyl - 4',5' - benzo - 3 - pyrrolothiacarbocyanine p-toluenesulfonate (1.59 grams, 1 mol.), 4-anilinomethylene - 3 - methyl - 1 - phenyl - 5 - pyrazolone (1.38 grams, 1 mol. plus 50 percent), and acetic anhydride (0.4 ml., 1 mol. plus 50 percent) were dissolved in pyridine (20 ml.) and heated to reflux temperature. Triethylamine (0.7 ml., 1 mol. plus 100 percent) was then added with stirring and the reaction mixture allowed to cool slowly to room temperature. The crude dye was thrown out of solution by the addition of water (100 ml.), the water decanted and the residue stirred with methyl alcohol (100 ml.) until crystalline. The mixture was then chilled, filtered, and the crude dye washed with methyl alcohol and dried. After two recrystallizations from pyridine and methyl alcohol, the yield was 0.16 gram (10 percent). M. P. 220–1° C. dec.

It can be seen from the above examples that in addition to representing an alkyl group, the R₂ of Formulas I and II above can represent a hydrogen atom or an aryl group, such as phenyl, o-, m-, and p-tolyl, o-, m-, and p-chlorophenyl, etc. (e. g. a mononuclear aromatic group of the benzene series).

The following examples will serve to illustrate more fully the manner whereby we prepare the new intermediates represented by Formula III above.

*Example 27.*—1,3' - diethyl - 2,5,6 - trimethyl - 3 - pyrrolothiacarbocyanine perchlorate

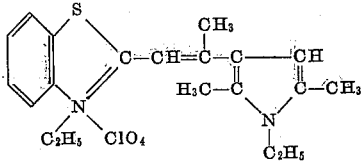

3 - ethyl - 2 - methylbenzothiazolium p - toluenesulfonate (34.9 grams, 1 mol.), 1-ethyl-2,5-dimethylpyrrole (14.6 grams, 1 mol.+10 percent excess) and ethyl orthoacetate 24.3 grams, 1 mol.+200 percent excess) were refluxed in ethyl alcohol (25 ml.) for 4 hours. The reaction mixture was chilled and treated with aqueous sodium iodide (20 grams in 150 ml.). The solid which separated was filtered off and discarded. The filtrate was treated with an additional 400 ml. of water and chilled overnight. The product which separated was filtered off, washed with acetone and dried. After conversion to the perchlorate and two recrystallizations from methyl alcohol (and filtered through decolorizing carbon) the yield of pure dye was 4.5 percent; melting point 188°–190° C.

*Analysis.*—Calculated for $C_{20}H_{25}ClN_2O_4S$: C, 56.54; H, 5.93. Found: C, 56.9; H, 6.7.

*Example 28.*—*1 - ethyl - 2,3',5,6 - tetramethyl - 3-pyrrolothiacarbocyanine perchlorate*

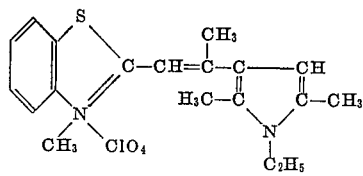

Replace the 3-ethyl-2-methylbenzothiazolium p-toluenesulfonate used in the above example by 1 mol. of 2,3-dimethylbenzothiazolium p-toluenesulfonate.

The dye iodides separated in Examples 27 and 28 above were converted to the perchlorates for more facile and accurate identification, although the dye iodides were most advantageously employed in the dye condensation to produce the dyes of Formulas I and II.

*Example 29.*—*1 - ethyl - 2,3',5,6 - tetramethyl - 4',5'-benzo-3-pyrrolothiacarbocyanine iodide*

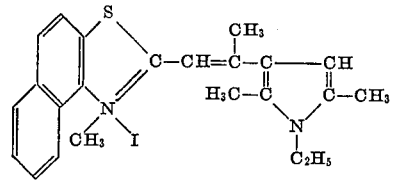

1,2 - dimethylnaphtho[1,2]thiazolium p - toluenesulfonate (38.5 grams, 1 mol.), 1-ethyl-2,5-dimethylpyrrole (15 grams, 1 mol. +10 percent excess) and ethyl orthoacetate (24.3 grams, 1 mol.+200 percent excess) were refluxed in ethyl alcohol (100 ml.) for three hours. The reaction mixture was then treated with sodium iodide (20 grams) in water (200 ml.), chilled overnight and the solid filtered off and discarded. The solution was treated with an additional 200 ml. of water, chilled, and the aqueous layer decanted. The oily layer was repeatedly washed with water and ether and finally treated with aqueous sodium iodide. The aqueous layer was decanted and the residue stirred with acetone until crystalline and then filtered and dried. The crystalline product was stirred with cold pyridine (30 ml.), filtered, and the residue discarded. The pyridine solution was treated with stirring with ether (100 ml.) and the solid product filtered off and washed with ether. After two recrystallizations from methyl alcohol, the yield of pure dye was 14 percent; M. P. 173°–4° C. dec.

*Example 30.*—*2,3',5,6 - tetramethyl-1-phenyl-4',5'-benzo-3-pyrrolothiacarbocyanine iodide*

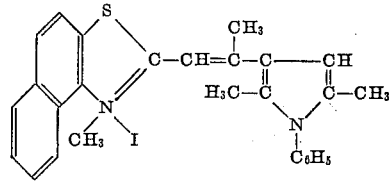

1,2-Dimethylnaphtho[1,2]thiazolium p - toluenesulfonate (38.5 grams, 1 mol.), 2,5-dimethyl-1-phenylpyrrole (20 grams, 1 mol.+10 per cent excess) and ethyl orthoacetate (25.0 grams, 1 mol.+200 percent excess) were refluxed in ethyl alcohol for three hours and then treated with sodium iodide (20 grams) in water (400 ml.) and chilled overnight. The aqueous solution was decanted and the residue washed with water and ether and finally stirred with acetone until crystalline. The crude dye was filtered off and then boiled with water (200 ml.) and filtered hot. The residue was washed with acetone and dried. After two recrystallizations from methyl alcohol (and filtered through decolorizing carbon) the yield of pure dye was 2 percent; M. P. 192°–3° C. dec.

*Example 31.*—*3' - ethyl - 8 - methyl-4',5'-benzo-3-indolothiacarbocyanine iodide*

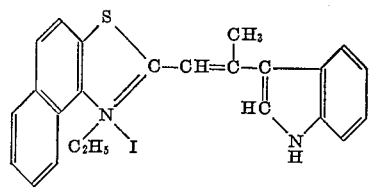

1-ethyl-2-methylnaphtho[1,2]thiazolium p - toluenesulfonate (20 grams, 1 mol.), indole (7.5 grams, 1 mol.+20 percent excess) and ethyl orthoacetate (16 grams, 1 mol.+300 percent excess) were dissolved in acetic acid (25 ml.) and heated under reflux for 30 minutes. The reaction mixture was cooled, poured into water (200 ml.) and stirred with ether (200 ml.). The ether and water were decanted and the crude dye was washed with water, dissolved in ethyl alcohol and converted to the iodide by the addition of sodium iodide (5 grams) in water (50 ml.). The crude iodide was filtered off, washed with acetone and dried. After two recrystallizations from methyl alcohol, the yield of pure dye was 5%; M. P. 231°–3° C. dec.

*Example 32.* — *2,3',8-trimethyl-4',5'-benzo-3-indolothiacarbocyanine p-toluenesulfonate*

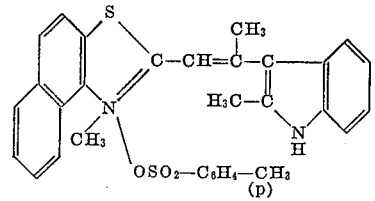

1,2 - dimethylnaphtho[1,2]thiazolium p - toluenesulfonate (19.3 grams, 1 mol.), 2-methylindole (7.5 grams, 1 mol.+20 percent excess) and ethyl orthoacetate (16.2 grams, 1 mol.+300 percent excess) were refluxed in acetic acid (25 ml.) for 30 minutes. The reaction mixture was cooled and then poured into water (400 ml.) and stirred until crystallization started. The reaction mixture was then chilled overnight, filtered, and the crude dye stirred with acetone, again filtered, and dried. After two recrystallizations from methyl alcohol, the yield of pure dye was 27 percent; M. P. 212°–13° C. dec.

*Example 33.* — *3' - ethyl - 1,3,8-trimethyl-4',5'-benzo-2-indolothiacarbocyanine iodide*

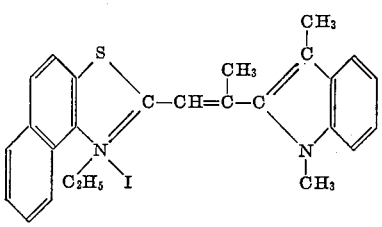

1 - ethyl - 2 - methylnaptho[1,2]thiazolium p - toluenesulfonate (20 grams, 1 mol.), 1,3-dimethylindole (7.25 grams, 1 mol.) and ethyl orthoacetate (16.2 grams, 1 mol.+300 percent excess) were dissolved in acetate acid (25 ml.) and heated rapidly to boiling over a free flame and boiled for thirty seconds. The reaction mixture was then poured into water (200 ml.) and treated with sodium iodide (20 grams). The aqueous portion was decanted and the solid washed with water. The dye was extracted from the quaternary salt with five 200 ml. portions of acetone. The acetone solutions were concentrated to 25 ml., chilled, filtered, and the crude dye dried. After two recrystallizations from methyl alcohol the yield of pure dye was 3 percent; M. P. 209°–10° C. dec.

*Example 34. — 2,3′,8 - trimethyl-3-indoloxacarbocyanine iodide*

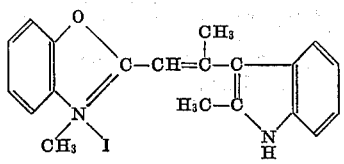

2,3-dimethylbenzoxazolium iodide (11.0 grams, 1 mol.), 2-methylindole (5.3 grams, 1 mol.), and ethyl orthoacetate (10 grams, 1 mol.+200 percent excess) were refluxed in acetate acid (15 ml.) for twenty minutes. The reaction mixture was then poured into cold water (200 ml.) and was treated with ether (150 ml.). The mixture was then filtered and the crude dye was washed with water, ether, and acetone. After two recrystallizations from methyl alcohol the yield was 9 percent; M. P. 263°–4° C. dec.

*Example 35.—3′,6-dimethyl-4′,5′-benzo-3-pyrrolothiacarbocyanine p-toluenesulfonate*

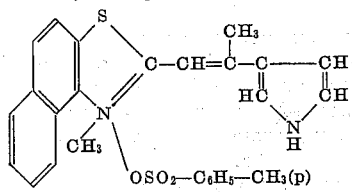

1,2-dimethylnaphtho [1,2] thiazolium p-toluenesulfonate (14.3 grams, 1 mol.), pyrrole (8 grams, 1 mol.+20 percent excess) and ethyl orthoacetate (16.2 grams, 1 mol.+300 percent excess) were refluxed in ethyl alcohol (50 ml.) for two hours. The reaction mixture was poured into cold water (200 ml.) and stirred until crystallization started. The mixture was then chilled, filtered, and the crude dye washed with water, ether, and acetone. After two recrystallizations from methyl alcohol, the yield was 8 percent; M. P. 223°–4° C. dec.

*Example 36.—3′-methyl-2-phenyl-4′,5′-benzo-1-pyrrocolothiacarbocyanine p-toluenesulfonate*

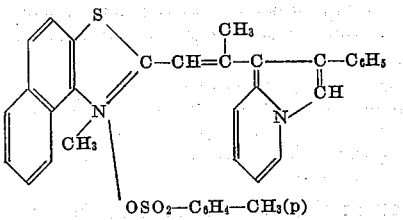

Replace the 2-methylindole of Example 32 with a molecularly equivalent amount of 2-phenylpyrrocoline. The dye was obtained as a thick oil, and was used as such in preparing the dye of Example 6.

*Example 37.—5′ - chloro-3′-ethyl-2,8-dimethyl-3-indolothiacarbocyanine p-toluenesulfonate*

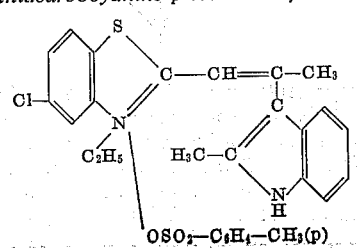

5-chloro-3-ethyl-2-methylbenzothiazolium p-toluenesulfonate (19.2 grams, 1 mol.), 2-methylindole (7.2 grams, 1 mol. plus 10 percent), and ethylorthoacetate (16.2 grams, 1 mol. plus 100 percent) were dissolved in acetic acid (40 ml.) and heated under reflux for thirty minutes. The reaction mixture was poured with stirring into water (500 ml.) and the stirring continued until crystallization started. The mixture was then chilled, filtered, and the crude product stirred with acetone, filtered, and dried. The yield of product was 7.5 grams (28 percent). A one-gram sample of the dye converted to the iodide and twice recrystallized from methyl alcohol yielded 0.55 gram (16 percent). M. P. 244–5° C. dec.

*Example 38.—3′ - ethyl - 2,8-dimethyl-3-indolothiacarbocyanine iodide*

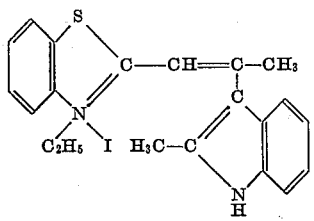

3-ethyl - 2 - methylbenzothiazolium p-toluenesulfonate (17.5 grams, 1 mol.), 2-methylindole (7.2 grams, 1 mol. plus 10 percent), and ethylorthoacetate (16.2 grams, 1 mol. plus 100 percent) were dissolved in acetic acid (40 ml.) and heated under reflux for thirty minutes. The reaction mixture was then poured into water (500 ml.), diethyl ether (400 ml.) added, and the mixture stirred and chilled. The crude product was gravity filtered, the solid dissolved in acetone (500 ml.) and filtered. The acetone solution was evaporated to dryness, the residue washed wtih water, dissolved in methyl alcohol (50 ml.), and converted to the iodide by the addition of sodium iodide (10 grams) in water (50 ml.). The aqueous alcohol was decanted, the residue washed with water, stirred with acetone (100 ml.) until crystalline and then heated to boiling. The mixture was then chilled, filtered, and the crude dye washed with acetone and dried. After two recrystallizations from methyl alcohol, the yield of pure dye was 3.9 grams (17 percent). M. P. 238–9° C. dec.

*Example 39.—3′ - ethyl-2,8-dimethyl-3-indolo-oxacarbocyanine iodide*

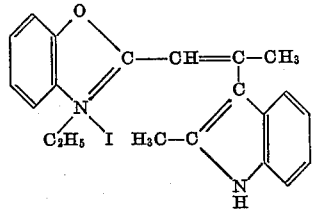

3-ethyl-2-methylbenzoxazolium iodide (14.5 grams, 1 mol.), 2-methylindole (7.2 grams, 1 mol. plus 10 percent), and ethylorthoacetate (16.2 grams, 1 mol. plus 100 percent) were dissolved in acetic acid (20 ml.) and heated under reflux for thirty minutes. The reaction mixture was poured into cold water (400 ml.) with stirring and then diethyl ether (200 ml.) was added. The mixture was then chilled, filtered, and the crude product stirred with acetone (50 ml.). The crude dye was filtered off, washed with acetone, and dried. The yield of pure dye after two recrystallizations from methyl alcohol was 3.3 grams (15 percent). M. P. 248–9° C. dec.

*Example 40.—3' - ethyl - 8-methyl-3-indolothiacarbocyanine iodide*

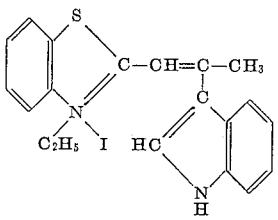

3 - ethyl - 2-methylbenzothiazolium p-toluenesulfonate (34.9 grams, 1 mol.), indole (11.7 grams, 1 mol.), and ethylorthoacetate (24.3 grams, 1 mol. plus 50 percent) were dissolved in acetic acid (50 ml.) and heated under reflux for thirty minutes. The reaction mixture was cooled, poured into water (500 ml.) containing sodium iodide (20 grams) and then chilled overnight. The aqueous solution was decanted, the residue stirred with acetone, chilled, and filtered. The crude product was washed with a little acetone and dried. After two recrystallizations from methyl alcohol, the yield of pure dye was 7.1 grams (16 percent). M. P. 249–50° C. dec.

*Example 41.—3'-ethyl-2,8-dimethyl-4',5'-benzo-3-indolothiacarbocyanine iodide*

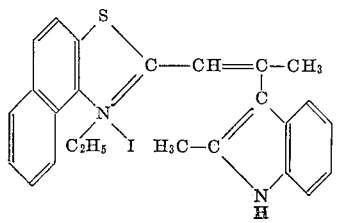

1-ethyl-2-methylnaphtho [1,2] thiazolium p-toluenesulfonate (20 grams, 1 mol.), 2-methylindole (7.8 grams, 1 mol. plus 20 percent), and ethylorthoacetate (16.2 grams, 1 mol. plus 100 percent) were dissolved in acetic acid (25 ml.) and heated under reflux for thirty minutes. The reaction mixture was poured into water (200 ml.) containing sodium iodide (15 grams) and diethyl ether (200 ml.) was added with stirring. The mixture was chilled overnight, filtered, and the crude product stirred with acetone (50 ml.), filtered, and dried. The yield of pure dye after two recrystallizations from methyl alcohol was 2.02 grams (8 percent). M. P. 221–2° C. dec.

We have found that our new dyes spectrally sensitized photographic silver halide emulsions when incorporated therein. The dyes are especially useful for extending the spectral sensitivity of the customarily employed gelatino-silver-chloride, gelatino-silver-chlorobromide, gelatino-silver-bromide and gelatino-silver-bormiodide developing-out emulsions. In the foregoing examples, the extent to which gelatino-silver-bromiodide developing-out emulsions can be sensitized as well as the point of maximum sensitivity are pointed out in connection with the dye of each example. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol has proved satisfactory as a solvent for most of our new dyes. Where the dyes are quite insoluble in methyl alcohol, for instance, a mixture of methanol and pyridine is advantageously employed as a solvent. The dyes are advantageously incorporated in the finished, washed emulsions and should be uniformly distributed throughout the emulsion.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory:

A quantity of dye is dissolved in methyl alcohol (or a mixture of methyl alcohol and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

When preparing intermediates as described in Example 35 above, wherein unsubstituted pyrrole is employed, the condensation might result in the formation of 3',6-dimethyl-4',5'-benzo-2-pyrrolothiacarbocyanine p - toluenesulfonate, although present evidence favors the compound depicted in Example 35.

As shown in Examples 24 and 25, the polymethine dyes represented by Formula II above can advantageously be prepared by condensing a compound selected from those represented by Formula III with a dialkoxymethyl acetate, e. g. diethoxymethyl acetate, etc., and a ketomethylene compound selected from those represented by the following general formula:

IX 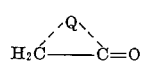

wherein Q has the values given above. The condensations can advantageously be carried out in the presence of a basic condensing agent, such as those set forth above for the condensation of the compounds of Formula III with those of Formula IV or V. Triethylamine has been found to be particularly efficacious in accelerating the desired condensation. Also, the condensation can be carried out in the presence of an inert diluent, such as pyridine, the aliphatic alcohols (e. g. ethanol, n-propanol, etc.), etc.

What we claim as our invention and desire secured by Letters Patent of the United States is:

1. A polymethine dye selected from those represented by the following general formula:

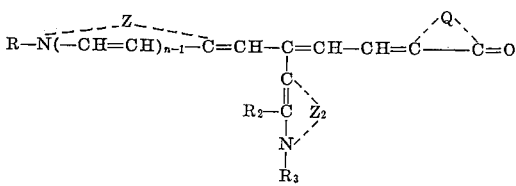

wherein R represents an alkyl group containing from 1 to 5 carbon atoms, $R_2$ represents a member selected from the group consisting of a hydrogen atom, an alkyl group containing from 1 to 2 carbon atoms, and a monocyclic aryl group of the benzene series, $R_3$ represents a member selected from the group consisting of a hydrogen atom, an alkyl group containing from 1 to 12 carbon atoms, a cyclohexyl group, and a monocyclic aryl group of the benzene series, and $R_2$ and $R_3$ together represent the non-metallic atoms necessary to complete a heterocyclic nucleus of the pyridine series, Z and Q each represents the non-metallic atoms necessary to complete a heterocyclic nucleus containing from 5 to 6 atoms in the heterocyclic ring, $Z_2$ represents the non-metallic atoms necessary to complete a heterocyclic nucleus of the pyrrole series, and $n$ represents a positive integer of from 1 to 2.

2. The polymethine dyes represented by the following general formula:

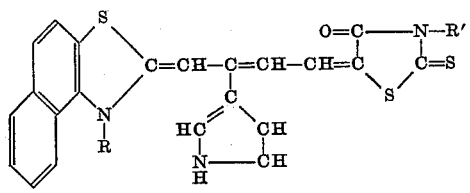

wherein R and R' each represents a lower alkyl group.

3. The polymethine dyes represented by the following general formula:

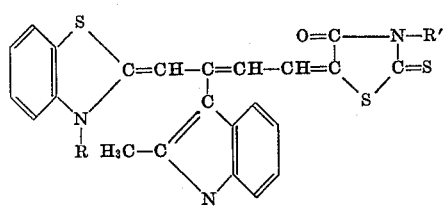

wherein R and R' each represents a lower alkyl group.

4. The polymethine dyes represented by the following general formula:

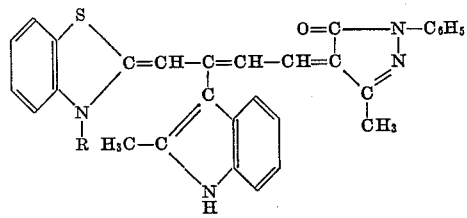

wherein R represents a lower alkyl group.

5. The polymethine dyes represented by the following general formula:

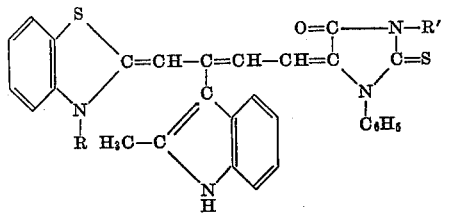

wherein R and R' each represents a lower alkyl group.

6. The polymethine dyes represented by the following general formula:

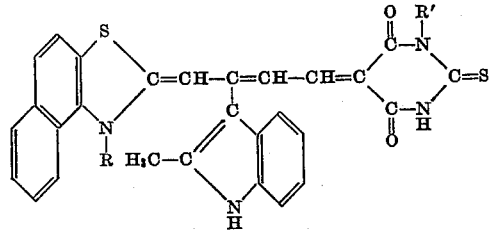

wherein R and R' each represents a lower alkyl group.

7. The polymethine dye having the following formula:

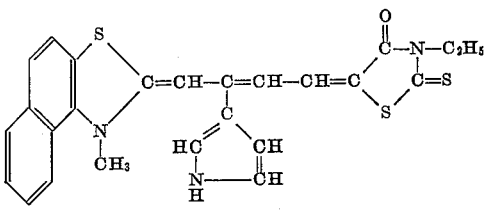

8. The polymethine dye having the following formula:

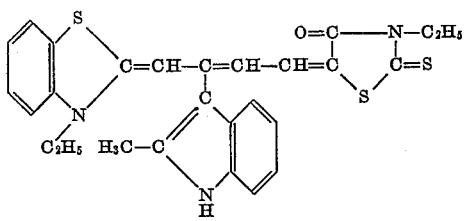

9. The polymethine dye having the following formula:

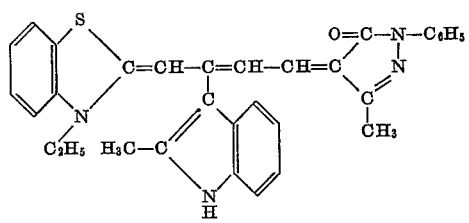

10. The polymethine dye having the following formula:

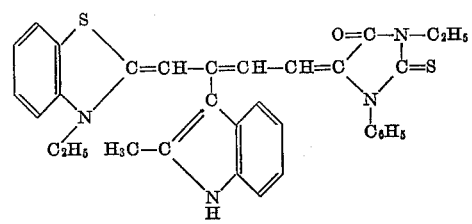

11. The polymethine dye having the following formula:

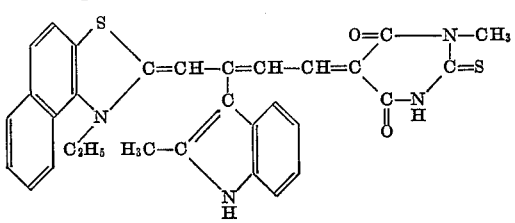

No references cited.